(12) United States Patent
Masters et al.

(10) Patent No.: US 7,667,698 B2
(45) Date of Patent: Feb. 23, 2010

(54) IMAGE DISPLAY SYSTEM FOR DISPLAYING AN ADJUSTABLE WIDENED VIRTUAL IMAGE

(75) Inventors: Peter Brian Masters, Fareham (GB); Andrew James Osborne, Eastleigh (GB); Martin James Rowe, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 10/942,796

(22) Filed: Sep. 17, 2004

(65) Prior Publication Data
US 2005/0041025 A1    Feb. 24, 2005

(51) Int. Cl.
G06T 15/00    (2006.01)
(52) U.S. Cl. .............................. 345/418; 348/58; 348/65
(58) Field of Classification Search ................. 345/418, 345/473; 348/58, 65
See application file for complete search history.

(56) References Cited

U.S. PATENT DOCUMENTS

| | | | | |
|---|---|---|---|---|
| 4,562,463 | A | 12/1985 | Lipton | 358/88 |
| 5,497,270 | A | 3/1996 | Rud | 359/629 |
| 5,751,341 | A | 5/1998 | Chaleki et al. | 345/419 |
| 5,808,591 | A | 9/1998 | Mantani | 345/82 |
| 6,532,008 | B1 | 3/2003 | Guralnick | 345/65 |
| 6,590,573 | B1 | 7/2003 | Geshwind | 345/419 |
| 6,795,067 | B2 * | 9/2004 | Masters et al. | 345/418 |
| 7,193,584 | B2 * | 3/2007 | Lee | 345/7 |

FOREIGN PATENT DOCUMENTS

EP    0595705 A1    5/1994

OTHER PUBLICATIONS

UK Search Report, Sep. 4, 2001.

* cited by examiner

*Primary Examiner*—Phu K Nguyen
(74) *Attorney, Agent, or Firm*—E. Dwayne Nelson, Esq.; McGinn IP Law Group, PLLC (57) ABSTRACT

An image display apparatus with a display device for displaying images and a viewing device for viewing an image in the left eye and a different image in the right eye. Two smaller images, a left image and a right image, are created from the same two-dimensional image. The left image includes, as it's left most part, the left most part of the two-dimensional image, the right image includes, as it's right most, the right most part of the image two-dimensional image, and both the left and right images include a common central part of the full image. When the left and right images are displayed such that the left eye sees one image and the right eye sees the other image, the viewer sees the two-dimensional image as a virtual image that can be wider than the viewable width of the display device. The width of the virtual image can be varied to accommodate the viewer.

21 Claims, 5 Drawing Sheets

IMAGE DISPLAY SYSTEM FOR DISPLAYING AN ADJUSTABLE WIDENED VIRTUAL IMAGE

TECHNICAL FIELD OF THE INVENTION

The present invention relates to variably increasing the apparent viewable width of a display device.

BACKGROUND OF THE INVENTION

There are products in the market place today that enable a single display device to be used for the viewing of 3D stereoscopic images. These employ a variety of techniques. One technique uses shuttered glasses and involves displaying alternate images for the left and right eyes where the images for the left eye are viewed only with the left eye and the images for the right eye are viewed only with the right eye. The shuttered glasses are synchronized with the display device and block the view of the left eye when the right image is displayed and vice-versa. The images seen are such that the brain joins these images together into a single virtual image that appears to be 3 dimensional. Such a system is described in U.S. Pat. No. 4,562,463, to Lipton.

Another technique involves painting two interleaved polarized images, on a specialized screen, simultaneously, one polarized vertically to be viewed by the left eye and one polarized horizontally to be viewed by the right eye. These images are then viewed through polarized glasses which contain a vertically striated filter for the left eye and a horizontally striated filter for the right eye. As a result each eye sees a different image and once again the images are such that the brain joins these images together into a single virtual image that appears to be 3 dimensional.

Other well known techniques used for displaying 3 dimensional images include the use of colored filters, mirror displays etc. However, such techniques are only used for creating the appearance of a 3 dimensional image based on two, slightly offset, views of the same image.

U.S. Pat. No. 5,497,270, to Rud, shows an apparatus and method for increasing resolution and expanding the displayed field of view for 2 dimensional images. This uses a complex system of lenses, partially reflective mirrors and polarizing cells that are used to alternately display the collimated left and right fields of view of an image to the viewer. This solution is applied to wide angle virtual reality systems such as head up displays and enable the user to see a wider, more detailed image than is otherwise possible.

However, none of these solutions provides a simple and adjustable means for creating a 2 dimensional virtual image that can be viewed on a display device with a viewable width that is narrower than the image seen. Simplicity is important to make the solution more widely available. Adjustability is necessary because individuals have different capabilities for viewing 2 dimensional virtual images and so the image must be displayed in a manner sympathetic to the capabilities of the viewer.

SUMMARY OF THE INVENTION

The present invention addresses the problem of creating a simple and adjustable means for viewing a 2 dimensional image wider than the viewable width of the display device on which it is displayed.

According to a first aspect, the present invention provides a data processing method for use on a data processing system, the data processing system having a display device for the display of images and a viewing device for viewing said images, the method comprising the steps of: reading a maximum virtual width from a value set b the user; building a left image and a right image from a display image, said left image and said right image including a common central part of said display image, said left image further including a left part of said display image that is not included in said right image and said right image further including a right part of said display image that is not included in said left image wherein either said left or said right image can be displayed fully on said display device; and displaying said left image and said right image on said display device wherein, in combination with said viewing device, an observer perceives a single virtual image that is no wider than said maximum virtual width.

According to a second aspect, the present invention provides an image processing apparatus comprising: a means for reading a maximum virtual width from a value set by the user; image building means for building a left image and a right image from a display image, said left image and said right image including a common central part of said display image, said left image further including a left part of said display image that is not included in said right image and said right image further including a right part of said display image that is not included in said left image; and image output means for generating image signals that contain said left image for viewing only by a first eye and said right image for viewing only by a second eye such that an observer could perceive a single virtual image that that is no wider than said maximum virtual display width.

The invention also provides an image display system by combining the image processing apparatus with; a display means for the processing of said image signals wherein an image contained in said image signal is displayed on a display device so as to display said left image and said right image; and a viewing device through which an observer views said left image and said right image on said display device such that said observer perceives a single virtual image that corresponds to said display image.

According to a further aspect, the present invention provides a computer program product for running on a data processing system having a display device for the display of images and a viewing device for viewing said images, the program product, in operation, carrying out the steps of: reading a maximum virtual width from a value set by the user; building a left image and a right image from a display image, said left image and said right image including a common central part of said display image, said left image further including a left part of said display image that is not included in said right image and said right image further including a right part of said display image that is not included in said left image wherein either said left or said right image can be displayed fully on said display device; and displaying said left image and said right image on said display device wherein, in combination with said viewing device, an observer perceives a single virtual image that is no wider than said maximum virtual width.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF THE DRAWINGS

A preferred embodiment of the present invention will now be described, by way of example only, with reference to the accompanying drawings.

DETAILED DESCRIPTION OF THE PREFERRED EMBODIMENT

The present invention thus provides the ability to use a display device, such as a monitor display screen, to view an image that is wider than the viewable width of the display device. The left most part of the image is seen only by the first eye, the right most part of the image is seen only by the second eye and the central part of the image is seen by both eyes. The brain uses this common central part to combine the two images and the user sees a single virtual image that is wider than the images seen by each eye. This is true whether the left eye sees the left image and the right eye sees the right image (the parallel technique, as if looking at a distant object) or the left eye sees the right image and the right eye sees the left image (the cross-eyed technique, as if looking at a near object), although some users will prefer one technique over the other. The maximum width of the virtual image is defined by the user. As the width of the virtual image increases relative to the viewable width of the display device it becomes more difficult to see an image and different users are capable of seeing different image widths. Setting the maximum virtual width allows a user to specify an image width that is comfortable. Also, if the user can dynamically change the maximum width of the virtual image, it is possible to gradually increase or decrease this width so that the user can gradually adjust to seeing the image as displayed. Once a maximum virtual width is set the method must, when appropriate, either reduce the width of full images to the maximum virtual width before creating left and right images or reduce the width of the left and right images after they have been created such that when viewed an image is perceived that is the maximum virtual width wide.

Because different users find it easier to use either the parallel technique or the cross-eyed technique when viewing images, the invention preferably allows the user to specify which eye sees which image. For the parallel technique the left image is displayed to the left eye and the right image is displayed to the right eye, whereas for the cross-eyed technique the right image is displayed to the left eye and the left image is displayed to the right eye.

The invention can also offer the user the flexibility to configure the size of the display window. This enables the user to configure a display window that is narrower than the actual viewable width of the display device. For example, the user could request to see a virtual image of 640×480 using a display window of 500×480 on a display device capable of displaying 640×480 images. Note that if the display device can only accept full screen images the method is also required to add additional blank areas to the image. This allows an image to be displayed in an area of the viewable window of the display device that is smaller than the image.

There are several different ways in which the images can be viewed. Indeed the viewing device can include most apparatus that are used to display 3 dimensional virtual images such as those that make use of polarization, red/blue filters, mirroring etc. As a result it is necessary to display the left and right images either simultaneously or alternately. Preferably the viewing device used is shuttered glasses and the left and right images are displayed alternately in synchronization with the shuttered glasses.

With these capabilities the present invention has many useful applications. These might include:

Increasing the size of the workspace on a computer system. For instance some operating systems provide a so-called "virtual desktop" where, for example, a desktop of 800×600 can be used on a 640×480 viewable display and the user can scroll around the desktop. The present invention could provide such a system with a virtual display of 800×480 thus increasing the viewable area of the virtual desktop.

Viewing widescreen television pictures on a standard television set.

Viewing images of greater width than can be seen with the naked eye. This can be true for individuals with a limited field of vision, such as is experienced by sufferers of *Retinitis Pigmentosa*.

In the preferred embodiment the current invention is used to vary, according to user requirements, the apparent width of a display device connected to a standard computer system and using shuttered glasses. This is achieved by writing a display device driver and providing a device driver configuration tool, using a "hotkey", that enables the user to configure:

The actual display width, which is the display width of the display device. (eg: 640 pixels).

The maximum virtual display width, which is the maximum width of the virtual image as seen by the viewer (eg: 800 pixels).

The viewing device (shuttered glasses in the preferred embodiment).

Which eye is to see the left image and which eye is to see the right image.

Applications and the operating system may then generate images for displaying to the user based on either the display width or the virtual display width of the display device.

Figure 1:
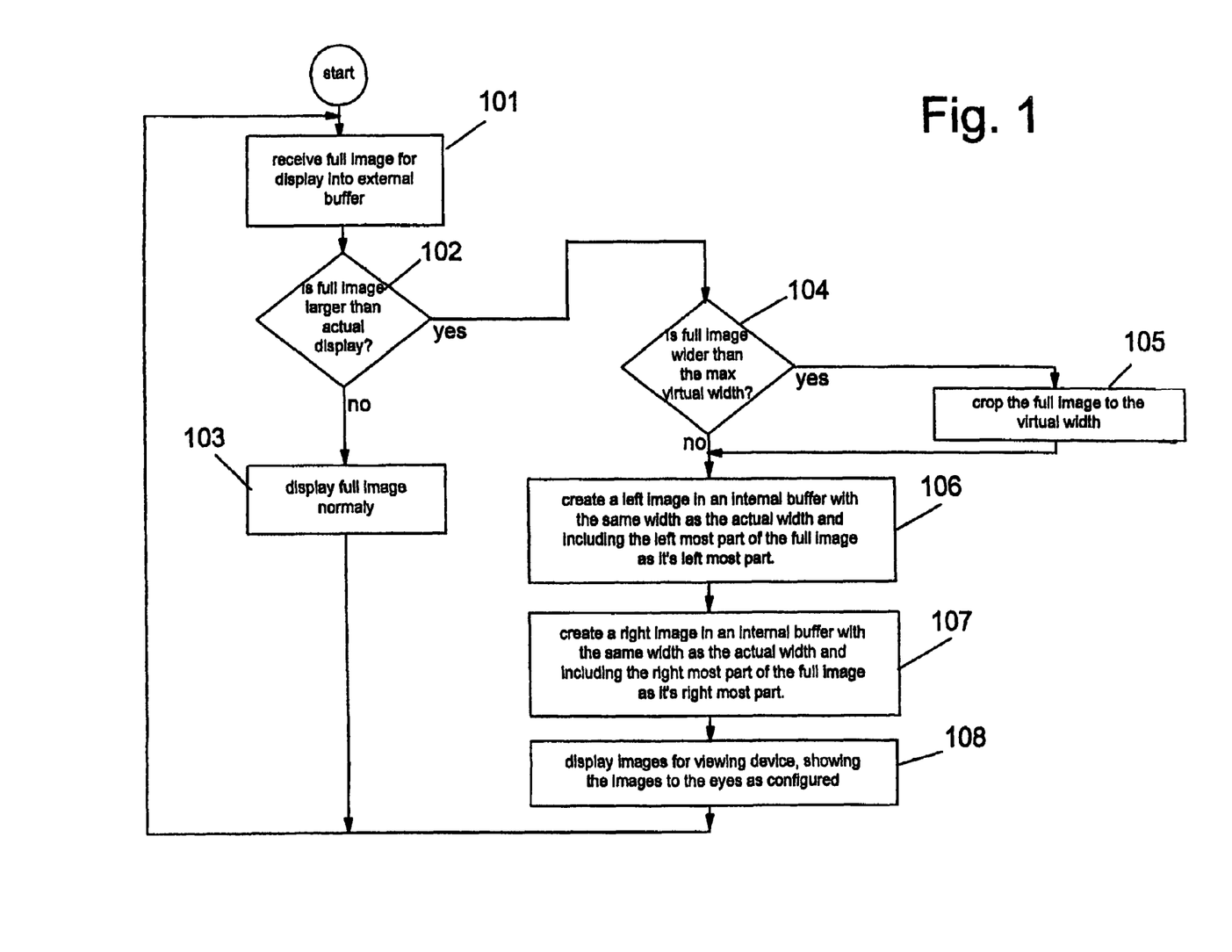
FIG. 1 is a flow chart showing the processing steps of a method of displaying images in a data processing apparatus, according to the present invention.

This is illustrated by the processing of the display device driver in the preferred embodiment as shown in FIG. 1. At step 101 the device driver receives an image for display from an application or the operating system. At step 102 a check is made to see if the image received (full image) is wider than the actual display width. If it is not, the device driver instructs the display adapter to display the image on the display device at step 103 and returns to step 101 as above. However, if the full image is wider than the actual display, processing proceeds from step 102 to step 104 where a check is made to see if the full image is wider than the configured maximum virtual display width. If this is the case, at step 105 the full image is cropped by equal amounts on the left and right sides to produce an image that is the maximum virtual display width wide. Whether or not the image was cropped, processing continues at step 106 where a left image is created and saved in a first internal buffer. The left image is created to be as wide as the actual display width and to include, as its left most part, the left most part of the full (or cropped) image. At step 107 the right image is created and saved in a second internal buffer. The right image is created to be as wide as the actual display width and to include, as its right most part, the right most part of the full (or cropped) image. Having created the left and right images at step 108, the device driver instructs the display adapter to display the images on the display device according to the requirements of the shuttered glasses and the users configuration of which eye is to see which image. This requires the left and right images to be displayed alternately, at the refresh rate of the display device, such that, in combination with the shuttered glasses and according to the users configuration, either the left eye sees only the left image and the right eye sees only the right image, or the left eye sees only the right image and the right eye sees only the left image. The brain then joins these images together and assuming that the refresh rate is around 100 Hz the viewer sees a steady virtual image of the full (or cropped) image that is the maximum virtual width wide (the actual required refresh rate will vary by user).

An additional aspect of this display device driver is that the configuration tool enables the user to dynamically configure the maximum virtual display width and the device driver uses the latest configured value. Because the configuration tool can be started using a "hotkey" (eg: <alt>W) it can be started when another application is processing and as a result the maximum virtual display width can be configured whilst the application is running. In this way, if an application is started that uses a virtual width of 800 pixels on a display device with an actual display width of 640 pixels, the user can start the configuration tool, set the maximum virtual width at 640 pixels and gradually increase it until the full image as provided by the application is displayed. This can make it easier for the user to adjust to the viewing of images in the manner described.

One advantage of this embodiment of the display device driver is that existing applications can continue to work unmodified, even if they generate images for shuttered glasses. This is because they will generate images the same width as the actual display width and the device driver displays such images without modification.

Figure 2:
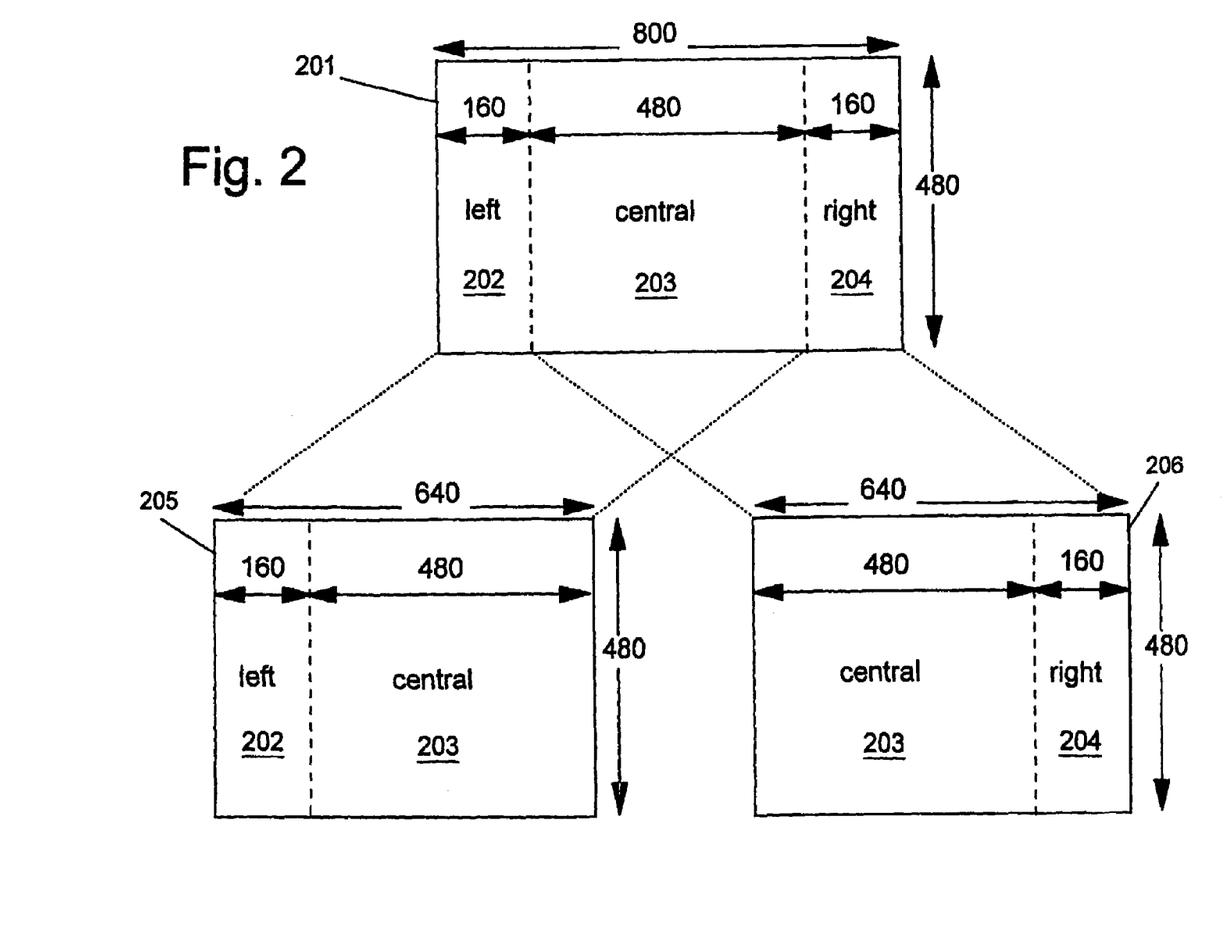
FIG. 2 is an illustration of how an image can be split into a left and a right image according to the present invention.

FIG. 2 shows in more detail how, according to the preferred embodiment, an image is split into left and right images assuming that the actual display width is 640 pixels and the maximum virtual display width is 800 pixels. The figure shows a full image (201) that is the same width as the maximum virtual display width. This full image is logically split into three parts: a left part (202) that is 160 pixels wide; a central part (203) that is 480 pixels wide; and a right part (204) which is the same width as the left part. The left image (205) is then made up of the left and central parts (202,203) of the full image (201) and the right image (206) is made up of the central and right parts (203,204) of the full image (201). Both left and right images (205,206) are 640 pixels wide which match the actual display width. The widths assigned to the left, central and right parts of the image are simply calculated:

left width=right width=(maximum virtual display width)−(actual display width)

central width=(actual display width)−left width

Figure 3:
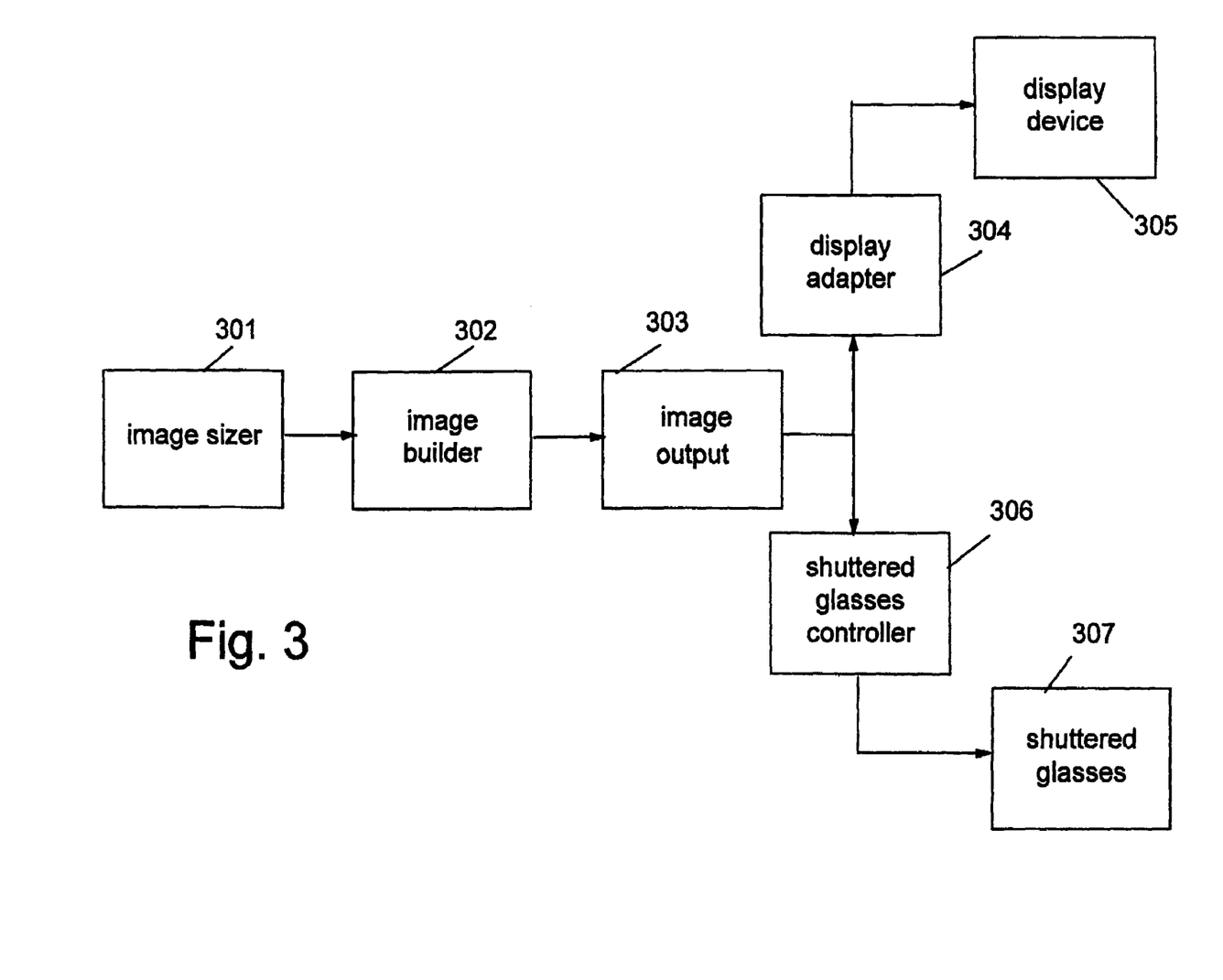
FIG. 3 is a schematic diagram of the interaction between the device driver in the preferred embodiment, the display device and the viewing device.

FIG. 3 illustrates how the device driver, display device and viewing device interact. The device driver comprises an image sizer (301), an image builder (302) and an image output (303); the display device comprises a display adapter (304) and a display device (305); and the viewing device comprises a viewing device controller (306) and shuttered glasses (307). The image sizer (301) reads the user configured maximum virtual width and, if necessary, reduces the width of the full image to this width in order to create an image for display. The image builder (302) creates left and right images, as necessary, from the image to be displayed. The image output (303) outputs image signals for the display adapter (304) causing the designated left and right images to be displayed alternately on the display device (305). The shuttered glasses controller (306) detects the alternating image signals and instructs the shuttered glasses (307) when to block the left eye view and when to block the right eye view.

Figure 4A:
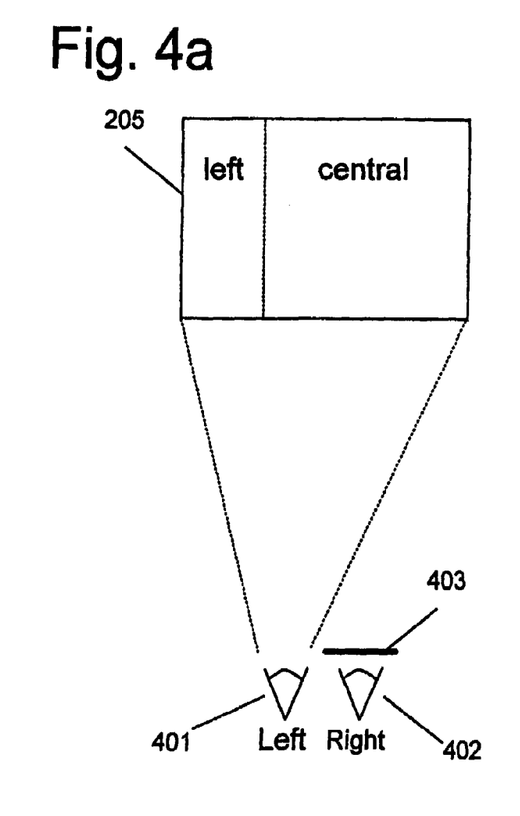
FIGS. 4a and 4b are an illustration of how a virtual image is created and viewed according to the preferred embodiment of the present invention.
Figure 4B:
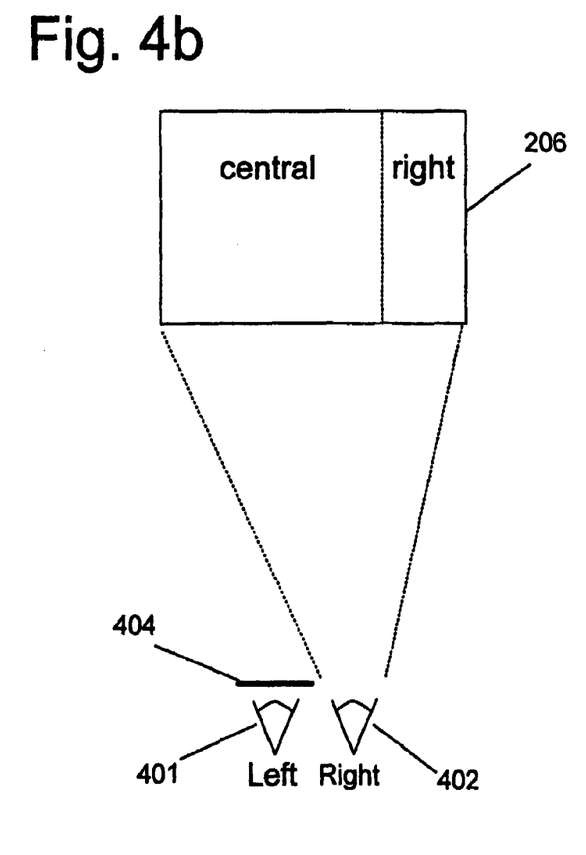

FIGS. 4a and 4b illustrate how the left and right images (205,206) are viewed by the user that has configured the left image to be seen by the left eye and the right image to be seen by the right eye. FIG. 3a shows that when the user views the left image (205) their left eye (401) sees the image whilst the right eye (402) is blocked by a device (403) and does not see the image. Conversely, FIG. 3b shows that when the user views the right image (206) their right eye (402) sees the image whilst the left eye (401) is blocked by a device (404). In the preferred embodiment shuttered glasses provide the blocking devices (403, 404). If the images are viewed in this manner such that each sees alternate images and each eye sees at least approximately 50 images a second the brain joins the images together and the user sees the full virtual image.

There are many alternatives to the preferred embodiment. One important aspect of the invention is that a 2 dimensional full image is split into a left image and a right image and the viewer views the left image in one eye and the right image in the other eye. In the preferred embodiment this is done by the display device driver, but this could just as easily done by the operating system or an application. In addition the display device and viewing device can include most apparatus that are used to display 3 dimensional virtual images such as those that make use of polarization, red/blue filters, mirroring etc.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims:

The invention claimed is:

1. An image processing apparatus, comprising:
   a display device that displays an image, wherein said display device includes a predetermined viewable width;
   an image builder that builds a virtual image from said image; and
   an image output generator that views said virtual image including a viewable width that is greater than the viewable width of the display device.

2. The image processing apparatus as claimed in claim 1, wherein a viewable width of the virtual image comprises an adjustable viewable width.

3. The image processing apparatus as claimed in claim 1, further comprising a reader that reads a maximum virtual width from a value set by a user.

4. The image processing apparatus as claimed in claim 1, wherein the image builder is configured to build a two-dimensional virtual image.

5. The image processing apparatus as claimed in claim 1, wherein the viewable width of the virtual image is based on two different positions of the virtual image being alternately displayed within the display device and alternately presented as the virtual image.

6. An image processing apparatus, comprising:
   means for displaying an image, wherein said means for displaying includes a predetermined viewable width; and means for viewing a virtual image including a viewable width that is greater than the viewable width of the means for displaying on which the image is displayed.

7. The image processing apparatus as claimed in claim 6, wherein the viewable width of the virtual image comprises adjustable viewable width.

8. The image processing apparatus as claimed in claim 6, further comprising means for reading a maximum virtual width from a value set by a user.

9. An image apparatus, comprising:
a display device configured to provide an image, the display device having a maximum viewable width; and
an image processor configured to direct the display device to provide a final image,
wherein the final image comprises a first image and a second image, the first image and the second image being provided by the display device, and
wherein the final image comprises a virtual width that is greater than the maximum viewable width of the display device.

10. The image apparatus of claim 9, further comprising an image viewer, the image viewer configured to combine the first image and the second image to form the final image.

11. The image apparatus of claim 10, wherein the first image and the second image are alternately displayed by the image viewer.

12. The image apparatus of claim 9, wherein the image comprises an original image, and
wherein the image processor is configured to reduce a width of the original image to match the virtual width.

13. The image apparatus of claim 9, wherein the image processor is configured to reduce a width of the first image and the second image to match the virtual width.

14. The image apparatus of claim 9, wherein when the image processor receives the image for display, the image processor determines whether the image is wider than the maximum viewable width, and if the image is determined to be wider than the maximum width, the image processor determines whether the image is wider than the virtual width, and if the image is determined to be wider that the virtual width, the image processor is configured to crop the image on both sides to produce an intermediate image that is the virtual width.

15. The image apparatus of claim 14, wherein the image is cropped by equal amounts on a left hand side and a right hand side of the image.

16. The image apparatus of claim 14, wherein the image processor creates the first image from the intermediate image.

17. The image apparatus of claim 14, wherein the image processor creates the second image from the intermediate image.

18. The image apparatus of claim 14, wherein the image processor creates a left-side image from the intermediate image,
wherein the left-side image comprises the left-most part of the intermediate image.

19. The image apparatus of claim 18, wherein the image processor creates a right-side image from the intermediate image,
wherein the right-side image comprises the right-most part of the intermediate image.

20. The image apparatus of claim 19, wherein the left-side image and the right-side image are displayed by the display device to provide a final image.

21. The image apparatus of claim 9, wherein the image processor is configured to adjust the virtual width.

\* \* \* \* \*

UNITED STATES PATENT AND TRADEMARK OFFICE
CERTIFICATE OF CORRECTION

Page 1 of 1

PATENT NO. : 7,667,698 B2
APPLICATION NO. : 10/942796
DATED : February 23, 2010
INVENTOR(S) : Peter Brian Masters et al.

It is certified that error appears in the above-identified patent and that said Letters Patent is hereby corrected as shown below:

On the title page insert:

Item --(63) Related U.S. Application Data

Divisional Application of serial No. 09/683,475 (now U.S. Patent No. 6,795,067), filed on January 4, 2002.--

Item --(30) Foreign Application Priority Data

January 6, 2001 (GB).................................................................................0100380--

In the Specifications

Before "Background of the Invention", in Column 1, insert:

--CROSS-REFERENCE TO RELATED APPLICATIONS

This application is a divisional of U.S. Patent Application No. 09/683,475, filed January 4, 2002, now U.S. Patent No. 6,795,067, issued on September 21, 2004, which claims priority to British Patent Application No. GB0100380.5 which was filed on January 6, 2001.--

Signed and Sealed this
Seventeenth Day of December, 2013

Margaret A. Focarino
*Commissioner for Patents of the United States Patent and Trademark Office*